United States Patent [19]

Güttler

[11] Patent Number: 4,864,948
[45] Date of Patent: Sep. 12, 1989

[54] HYDRODYNAMICALLY MODIFIED HULL FOR A WATER CRAFT

[76] Inventor: Jo Güttler, Hansegartenstrasse 6, D-7750 Konstanz, Fed. Rep. of Germany

[21] Appl. No.: 171,071

[22] Filed: Mar. 21, 1988

Related U.S. Application Data

[63] Continuation of Ser. No. 912,825, Sep. 26, 1986, abandoned, which is a continuation-in-part of Ser. No. 698,633, Feb. 6, 1985, abandoned.

[51] Int. Cl.$^4$ ................................................ B63B 1/08
[52] U.S. Cl. ................................ 114/39.1; 114/67 A; 114/271
[58] Field of Search ............... 114/67 A, 67 R, 284, 114/280, 282, 285, 271, 274, 343, 39.1

[56] References Cited

U.S. PATENT DOCUMENTS

| 1,196,682 | 8/1916 | Harriss | 114/145 R |
| 1,726,882 | 9/1929 | Boerner | 114/67 A |
| 2,151,836 | 3/1939 | Bugatti | 114/284 |
| 2,378,822 | 6/1945 | Barry | 114/67 A |
| 2,663,276 | 12/1953 | Ouellet | 114/67 A |
| 2,669,961 | 2/1954 | Thomas | 114/67 A |
| 3,289,623 | 12/1966 | Gray et al. | 114/67 A |
| 3,802,370 | 4/1974 | Collier | 114/271 |
| 4,418,632 | 12/1983 | Yoshimi et al. | 114/39.1 |
| 4,528,931 | 7/1985 | Lantz | 114/67 A X |

FOREIGN PATENT DOCUMENTS

| 7408520 | 12/1974 | Netherlands | 114/271 |
| 110326 | 4/1944 | Sweden | 114/67 A |
| 1009878 | 4/1983 | U.S.S.R. | 114/343 |

Primary Examiner—Sherman D. Basinger
Attorney, Agent, or Firm—Bachman & LaPointe

[57] ABSTRACT

A hull for a sail boat, wherein devices for the continuous hydrodynamic conversion of a displacement-type hull into a planing-type hull, even during sailing are provided on the stern in front of the hull end.

14 Claims, 2 Drawing Sheets

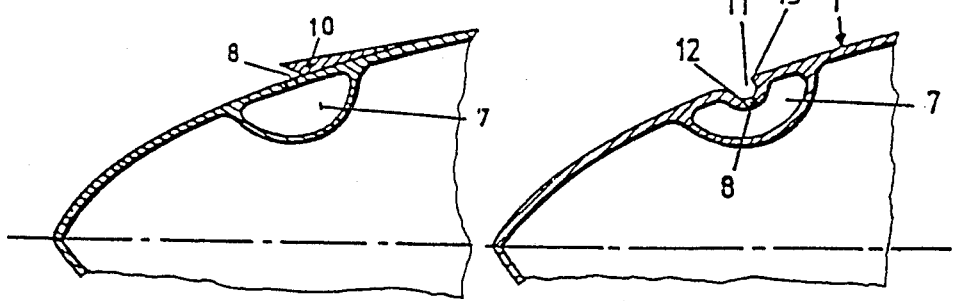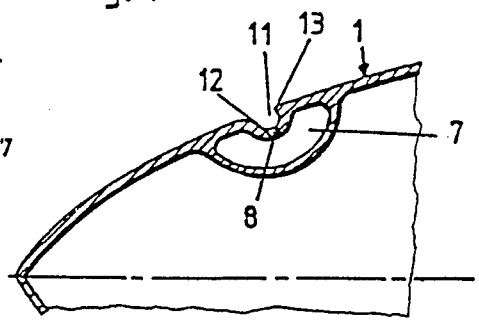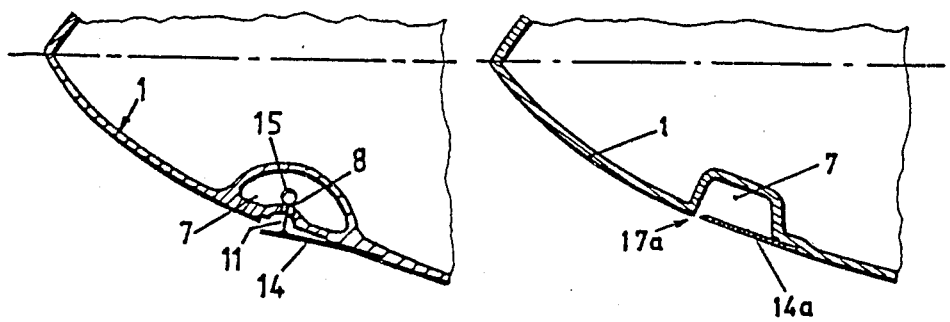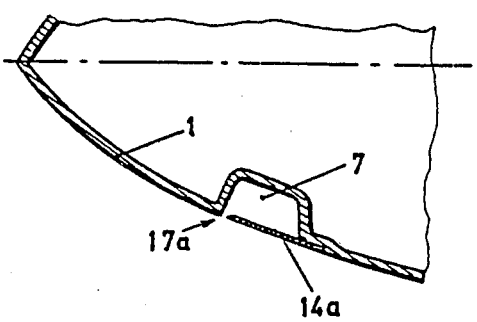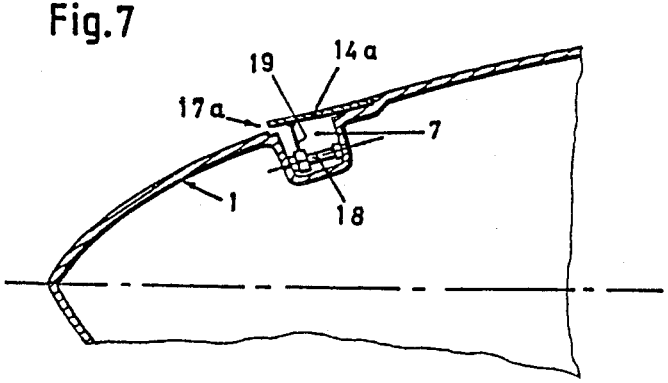

HYDRODYNAMICALLY MODIFIED HULL FOR A WATER CRAFT

CROSS-REFERENCE TO RELATED APPLICATION

This application is a continuation of application Ser. No. 912,825, filed Sept. 26, 1986, which in turn is a continuation-in-part of U.S. patent application Ser. No. 698,633 for WATERCRAFT, by Jo Guttler, filed Feb. 6, 1985, both now abandoned.

BACKGROUND OF THE INVENTION

The invention relates to a hull for a sail boat with a stern.

All watercraft have the special feature that the optimum, most favorable hull shape shows its optimum properties only at a precisely predetermined speed. However, all yachtsmen attempt to convert any wind force into the highest possible travelling speed, which is not possible with existing stern shapes.

The majority of water craft are subdivided by their hull shape into three groups, namely:
  watercraft with a displacement-type hull; particularly suitable for heavy craft and moderate speeds
  watercraft with a semi-planing-type hull; and
  watercraft with a planing-type hull, particularly suitable for fast and not too heavy craft.

The advantage of a displacement-type hull is low water resistance at low speed and excellent seaworthiness in heavy seas, particularly in the case of aft waves. However, a serious disadvantage of this stern shape is that at the so-called hull speed the water resistance increases very considerably. The suction resulting from the stern wave holds the boat firm and, e.g., when the boat is being towed by powerful tugs, this can mean that the boat is pulled below the surface of the water.

The prior art semi-planing-type hull is more favorable from this standpoint, since is breaks off a heavy stern wave by the breakdown stern over the waterline. However, it suffers from considerable disadvantages in rough seas and more particularly with aft waves, since fairly large waves pass over the boat.

The planing hull type can be used only on heavily motorized and very light boats, since at low speeds the broken-off stern dips into the water, thereby causing a very high resistance.

SUMMARY OF THE INVENTION

It is an object of the invention to develop a boat's hull which when stationary and/or even during sailing can be continuously converted hydrodynamically from a displacement-type hull with the known advantages into a planing-type hull with the known advantages, so that the hull shape can be and/or automatically is adapted hydrodynamically to the particular sailing speed.

To this end devices for the hydrodynamic modification of the hull and its length are disposed on the stern in front of the hull end and intersect the waterline WL at all sailing speeds.

This is achieved in that as a function of the speed, the stern wave is broken off to a varying extent downwardly and also forwardly of the boat's hull while the wave is still above the waterline, so that its suction can no longer cause resistance.

The devices for breaking off the stern wave intersect the waterline at an acute angle. As a result, even if the stern dips fairly deep into the water, the devices are always so located that the breakdown lines always extend above the surface of the water in the direction of travel and in front of the dipping points. Otherwise, the air supply ducts would become filled with water and rendered inoperative.

To achieve as stepless a hydrodynamic conversion as possible of the displacement-type hull into a planing-type hull, not just one device with a breakdown line, but a number of such devices can be disposed one after the other on the stern; if necessary they can also extend at different angles to one another and to the surface of the water (the waterline).

A very simple embodiment of this device comprises an air supply duct formed in the hull shell and a groove formed from outside therein, the air supply duct and the groove being interconnected via apertures.

Better results can be obtained with an embodiment which again comprises the aforementioned air supply duct and the groove, but in which the groove is covered with a flexible strip whose position can be modified by mechanical, pneumatic or hydraulic actuating elements. Due to the air emerging at this place, an air cushion is formed between the hull shell and the water, so that suction can no longer be formed, and therefore the stern wave is reliably separated from the hull.

A further possibility is for the air supply duct to be covered by a spring-like strip, leaving a slot. The strip is disposed in the plane of the hull shell, so that the shape of the strip has no speed-reducing effect at low speeds. According to a further improvement, the spring-like strip can be adjusted; for this purpose actuating elements are provided in the air supply duct.

Thus, in the case of the present invention, the advantages of a displacement-type hull can be fully utilized at low speeds and with rough seas. With an increase in speed, hull length can be hydrodynamically modified as required by the aforedescribed devices. Thus, for example, it is possible to make a yacht skim or surf in the same way as a jolly boat or centerboarder, since the stern is not pulled downwards. The speed barrier of maximum hull speed therefore no longer exists, and the displacement-type hull becomes a planing-type hull.

BRIEF DESCRIPTION OF THE DRAWINGS

Further advantages, features and details of the invention can be gathered from the following description of preferred embodiments thereof, with reference to the drawings, wherein:
FIG. 3—is a partial horizontal section through the rear part of the hull, taken along the line II—II in FIG. 1;
and
  FIGS. 4–7—illustrate further embodiments of a stern part, represented in the manner of FIG. 2.

DETAILED DESCRIPTION OF THE PREFERRED EMBODIMENTS

Figure 1A:
FIG. 1a—diagrammatically shows a displacement-type hull, FIG. 1b a semi-planing-type hull and FIG. 1c a planing-type hull.
Figure 1B:
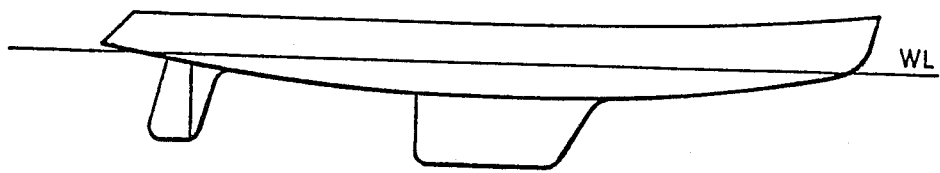
FIG. 1—illustrates several hulls diagrammatically.
Figure 1C:
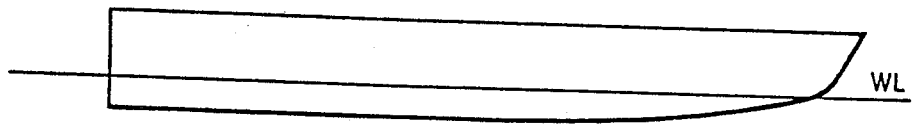
Figure 2:
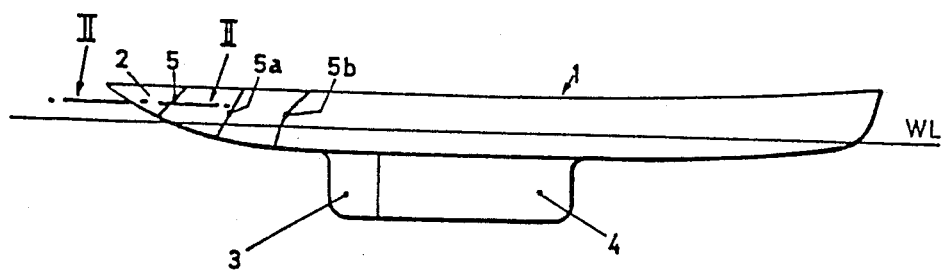
FIG. 2—a diagrammatic representation of a hull according to the invention.

FIG. 2 shows a hull shell 1 with a stern part 2, a rudder 3 and a keel 4. The lines 5 illustrate the position of activatable means for the separation of the stern wave.

Various embodiments of these means are shown in greater detail in FIGS. 3 to 7. Thus, FIG. 3 shows an air supply duct 7 with openings 8 shaped into the hull shell 1 and/or stern 2. The air supplied through duct 7 passes outwards into the water via openings 8 and raises same away from the hull shell 1, so that there is a separation of the stern wave. A breakdown edge 10 is mounted on the outside of the hull to boost the breakdown effect.

FIG. 4 shows an embodiment in which, in addition to the air supply duct 7, a groove 11 is shaped from the outside into the hull shell 1 and in it terminate the openings 8. The groove edge 13 simultaneously constitutes the breakdown edge.

FIG. 5 shows a further improved embodiment of the means for separating the stern wave according to FIG. 4. The breakdown edge is formed by a flexible strip 14, which is fixed in flush manner into the hull shell 1 in the direction of travel, but projects from hull shell 1 in the direction opposite to the travel direction and covers groove 11. However, strip 14 can e.g. also be under an inwardly directed initial tension. Holding members 15 can be constructed as a tension element, if strip 14 is outwardly tensioned. By pulling on the tension elements, it is then possible to control the position of the strip relative to the hull shell. If strip 14 is completely drawn in, it forms part of the hull shell 1. Thus, as required, the position of the strip 14 acting as the breakdown edge can be adjusted during travel and when stationary. This can take place automatically or in a controlled manner, e.g. as a function of the speed of the boat.

FIGS. 6 and 7 show especially preferred embodiments of the invention. FIG. 6 shows the air supply duct 7 covered by a strip 14a disposed in the plane of the hull shell 1. The strip 14a cooperates with the hull shell 1 to form a slot 17a from which air can emerge. A similar arrangement is also shown in FIG. 7, where however the strip 14a is constructed to move. For this purpose the air supply duct 7 has a drive 18, driving hydraulically, pneumatically or mechanically a drive rod 19 by means of which the strip 14a can be forced out of the plane of the hull shell.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A hull for a boat having a shell with a stern, said hull comprising a displacement-type hull, said hull having a water line and creating a wave adjacent said stern at the water line as said boat travels through the water, said hull further having an end adjacent said stern and means for hydrodynamically modifying the displacement-type hull into a planing-type hull disposed on an exterior surface on said hull in front of said hull end, said hydrodynamically modifying means intersecting the water line at all speeds and including a slot in said hull shell extending at an acute angle with respect to said waterline through which air flows and a strip having a first end fixed to the exterior of said hull shell and a second end movable with respect to said hull, whereby said hydrodynamic modifying means enables the hull to be adapted hydrodynamically to a particular sailing speed.

2. A hull according to claim 1 wherein said strip comprises a spring-like member forming a fixed breakdown edge.

3. A hull according to claim 1 wherein said strip comprises a flexible, spring-like strip having a trailing edge whose position relative to the stern can be modified forming said second end.

4. A hull according to claim 1 wherein said modifying means are shaped into said stern.

5. A hull according to claim 1 wherein said strip is shaped into said hull shell.

6. A hull according to claim 5 wherein said strip forms a spring-like breakdown edge and is provided adjacent said slot.

7. A hull according to claim 5 wherein said strip is in the form of a spring-like strip disposed in a plane of said hull shell, an air supply duct being at least partially covered by said spring-like strip, and said slot being located between said strip and said hull shell.

8. A hull according to claim 7 further comprising means provided in said air supply duct for moving said strip out of the plane of said hull shell.

9. A hull according to claim 1 wherein a plurality of said modifying means are disposed one after the other on said stern.

10. A hull for a boat having a shell with a stern, said hull having a water line and creating a wave adjacent said stern at the water line as said boat travels through the water, said hull further having an end adjacent said stern and means for hydrodynamically modifying the hull disposed on an exterior surface of said hull in front of said hull end, said hydrodynamic modifying means being shaped into said stern and intersecting the water line at all speeds and said hydrodynamic modifying means including a slot in said hull shell extending at an acute angle with respect to said waterline through which air flows, an air supply duct associated with said slot for permitting the creation of an air cushion between the hull and the water, and a strip having a first end fixed to the exterior of the hull shell and a second end movable with respect to said hull.

11. A hull according to claim 10 further comprising a shaped groove in the vicinity of said air supply duct and said slot being located in said groove.

12. A hull according to claim 11 wherein said modifying means further includes said strip in the form of a spring-like strip whose position with respect to the hull shell can be modified, said strip being arranged substantially flush with a plane of said hull shell, and said groove with said slot being covered by said strip.

13. A hull according to claim 12 further comprising means for automatically adjusting the position of said strip relative to said hull shell.

14. A hull for a boat having a shell with a stern, said hull having a water line and creating a wave adjacent said stern at the water line as said boat travels through the water, said hull further having an end adjacent said stern and means for hydrodynamically modifying the hull disposed on an exterior surface of said hull in front of said hull end, said hydrodynamic modifying means comprising a plurality of said modifying means disposed one after the other on said stern and extending at different angles to one another and to the water line, and each said hydrodynamic modifying means intersecting the water line at all speeds and further comprising a slot in said hull shell through which air flows and a strip having a first end fixed to the exterior of said hull shell and a second end movable with respect to said hull shell for forming said slot.

* * * * *